April 26, 1932.  P. K. SAUNDERS  1,855,991

DIAPHRAGM VALVE

Filed April 24, 1931  2 Sheets-Sheet 1

Inventor:
Philip Keith Saunders,
By Mawhinney & Mawhinney,
Attys.

April 26, 1932. P. K. SAUNDERS 1,855,991
DIAPHRAGM VALVE
Filed April 24, 1931 2 Sheets-Sheet 2

Inventor:
Philip Keith Saunders,
By Mawhinney & Mawhinney,
Attys.

Patented Apr. 26, 1932

1,855,991

UNITED STATES PATENT OFFICE

PHILIP KEITH SAUNDERS, OF LONDON, ENGLAND, ASSIGNOR TO SAUNDERS INVENTIONS, LIMITED, OF LONDON, ENGLAND, A CORPORATION OF THE UNION OF SOUTH AFRICA

DIAPHRAGM VALVE

Application filed April 24, 1931, Serial No. 532,576, and in Great Britain October 11, 1930.

This invention relates to diaphragm valves comprising a body with a substantially straight-through bore or passage intersected by a shallow weir extending across the width of the bore and part way of its depth, the weir having a concave upper face that forms part of or supports a seating with which the diaphragm co-operates.

Compared with the "annular" type of diaphragm valve, the diaphragm of the above "streamline" type undergoes a materially larger movement when moving from the fully closed to the fully open position, for a given pipe bore, and it may happen, therefore, that it will fail to open fully when the actuating member is operated in an opening direction if the pressure of the controlled fluid is below a predetermined value. For example, an insufficient opening pressure might arise in the case of a "streamline" type of diaphragm valve being mounted in a vertical passage to control the gravity flow of an impalpable or finely-ground powder along the passage. It is the primary object of the present invention to avoid this disadvantage.

According to this invention, the diaphragm has an imperforate operative surface and means for moving the diaphragm in an opening direction independently of the pressure of the controlled fluid. If the diaphragm were perforated it would be liable to leak; and if its operative surface carried metal parts, not only might these corrode from contact with the controlled fluid, but they might interfere with the true seating of the diaphragm.

Figure 1:
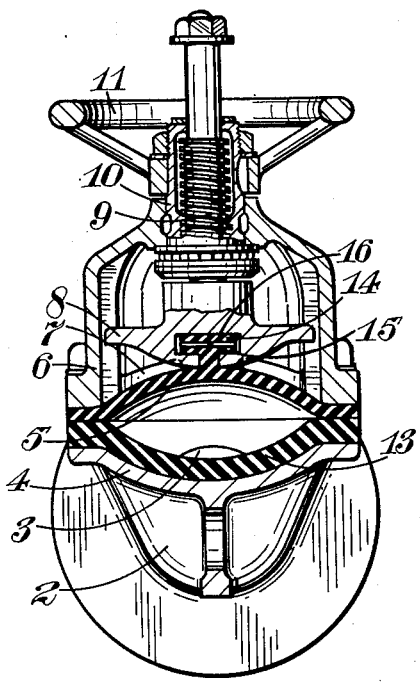
Figure 2:
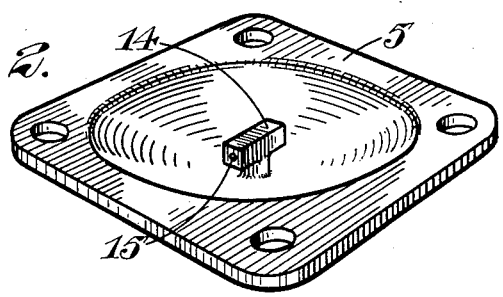
Figure 3:
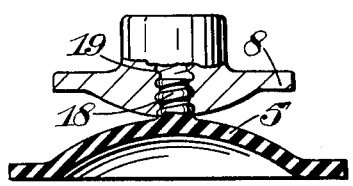
Figure 4:
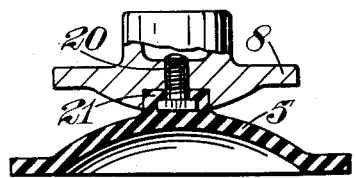
Figure 5:
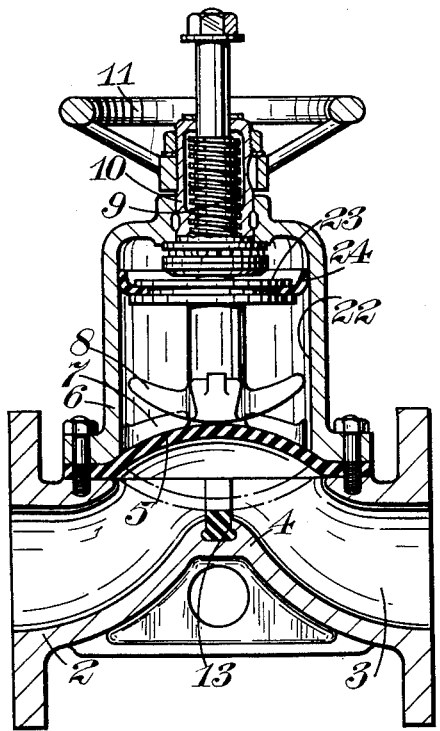
Figure 6:
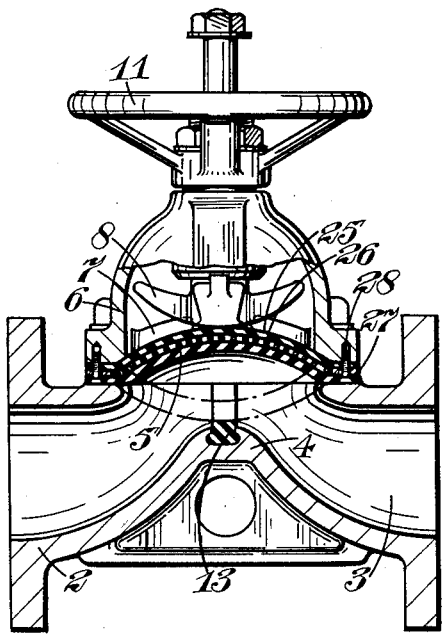
Figure 7:
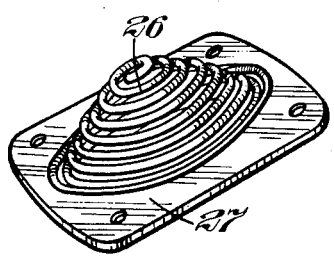
Figure 8:
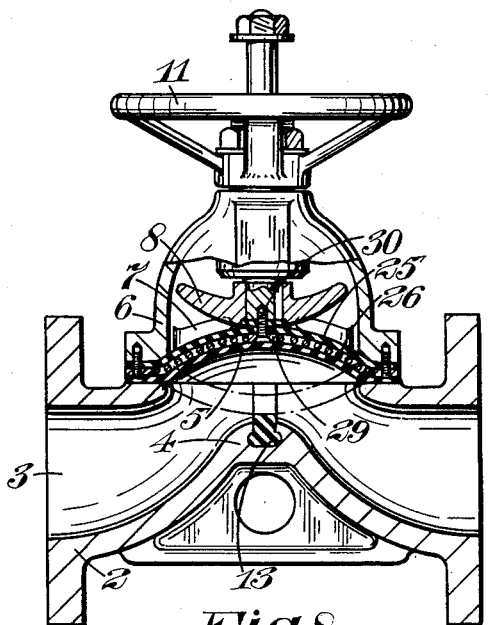

In the accompanying drawings,

Figure 1 is a transverse section of one form of diaphragm valve in accordance with the invention, Figure 2 is a perspective view of a diaphragm as used in Figure 1, Figures 3 and 4 are fragmentary part-sectional views of modifications of the above, Figure 5 is a longitudinal sectional elevation of another form of diaphragm valve in accordance with the invention, Figure 6 is a similar part-sectional view of an alternative construction, Figure 7 is a perspective view of a biasing spring as used in Figure 6, and Figure 8 is a view similar to Figure 6, showing a further modified construction.

Like numerals indicate like parts throughout the drawings.

In the constructions illustrated, the valve comprises a body portion 2 having a substantially straight-through bore or passage 3 intersected by a shallow weir at 4, which extends across the width of the bore and part way of its depth. The flexible diaphragm 5 is disposed above the weir 4, being clamped between the upper part of the valve body 2 and a cover 6.

When the valve is fully open, the pressure of the controlled fluid tends to force the diaphragm against a parti-spherical concave seating on radial fingers 7 projecting from the interior of the cover 6, so that fluid can flow over the weir in a streamlined path without any impedence.

To control the flow, the diaphragm is forced down towards the weir by a member having a parti-spherical convex head 8, with radial arms adapted to intermesh with the fingers 7. This actuating member has a screw stem 9 working in an internally-threaded sleeve 10 rotatably mounted in the upper part of the cover and connected to a hand wheel 11. Two of the radial arms are extended so as to co-operate with diametrically-opposed recesses 12 in the wall of the cover 6 and thus prevent angular movement of the actuating member.

The weir 4 is formed with a concave upper face having a rubber insert 13 against which the diaphragm seats when the valve is shut, and the object of this invention is to ensure that, whatever the pressure of the controlled fluid, the diaphragm shall respond to the upward movement of the actuating member 8 when the hand wheel 11 is turned in the opening direction.

In the construction illustrated in Figure 1, there is moulded on to the outer surface of the diaphragm 5 and centrally of the same an upstanding T-shaped member 14 of vulcanized rubber or other material. The head of this member is preferably of rectangular section, being reinforced, as shown, by means of a piano-wire 15 disposed longitudinally through its centre, while the stem is of circular section. The actuating member 8 is formed with an axial hollow 16 of a diameter greater than the length of the head of the member 13, and this hollow 16 communicates with the lower face of the actuating member by means of an elongated slot 17 shaped so as just to receive the above-mentioned head. Thus, the head can be inserted through the slot 17 and then twisted through 90 degrees in the manner of a key in a keyhole, by which means the diaphragm 5 is operatively attached to the actuating member so that when the latter is moved in an opening direction the diaphragm will be pulled after it. In this position the diaphragm is then clamped between the valve body 2 and the cover 6 so that it cannot become detached from the actuating member.

Figure 1 shows the parts operatively connected, the slot 17 being seen end-on.

It will be evident that the diaphragm should preferably be arranged to take the shape of a cup or dome when in its unstressed condition, so that the rubber or other material of which it is composed will be compressed as it passes through the centre position when being moved from the closing to the opening position, or vice versa.

By this means the diaphragm is normally biased to one of its extreme positions and its shape when unstressed ensures its effective seating against the fingers 7 or the weir 4. Figure 2 shows the diaphragm in the lower of its extreme positions, the head of the member 14 being somewhat below the upper surface of the diaphragm.

In the modified arrangement illustrated in Figure 3, the diaphragm 5 has moulded on its outer surface a relatively strong stem 18 provided with a coarse external screw-thread, and the end of the actuating member 8 is correspondingly axially bored and threaded at 19 so that the diaphragm may be attached thereto by a screwing action. Alternatively, as in Figure 4, use may be made of a metal screw 20 with its head embedded in a block 21 moulded on the outer surface of the diaphragm 5, the actuating member being correspondingly threaded.

If desired, means, which do not include a positive connection, may be employed for moving the diaphragm to open position and, according to a further feature of the invention, such means consist in effecting the application of sub-atmospheric pressure to the outer surface of the diaphragm.

In the construction illustrated in Figure 5, the valve cover 6 is formed as a cylinder 22 and a piston member 23, having a cup-shaped leather 24 adapted to work tightly therein, is mounted on the stem 9 of the diaphragm-actuating member 8. Thus, when the diaphragm-actuating member is raised, the piston 23 is raised at the same time so that, if the pressure of the controlled fluid is insufficient by itself to lift the diaphragm 5, the pressure above the diaphragm and below the piston falls below atmospheric pressure and thus assists in effecting the opening of the valve.

In the alternative arrangement illustrated in Figure 6, a subsidiary diaphragm 25, which may be of soft leather, is superposed on the working diaphragm 5, and there is a resilient device mounted between them. This resilient device is adapted to bias the subsidiary diaphragm 25 in an upward direction against the fingers 7, and it is illustrated as taking the form of a radially-progressing spiral spring 26 which is normally dome-shaped, with its convex surface uppermost.

Thus, when the diaphragm-actuating member 8 is raised the spring 26 causes the subsidiary diaphragm to follow the actuating member, and if the pressure of the controlled fluid is insufficient to raise the working diaphragm 5 the pressure between the two diaphragms is reduced below atmospheric pressure so that the pressure difference on the two sides of the working diaphragm will effect operation to the open position.

The spring 26, when relaxed, takes the shape shown in Figure 7, and it will be seen that it has an initial loading even when the subsidiary diaphragm 25 bears against the fingers 7. The spiral coils must, of course, be so spaced as to pass clear of one another when moved from one extreme position to the other.

As shown, the outer coil of the spring is welded or otherwise secured to the inner periphery of a steel gasket 27 which is secured by countersunk screws 28 to the valve cover 6, the upper diaphragm 25 being clamped between them. In an alternative construction, the upper diaphragm may be of rubber and the spring may be embedded therein.

In a modification of this arrangement, the subsidiary diaphragm 25 is actually attached to the diaphragm-actuating member, while the spring 26 may be free or, as shown in Figure 8, it may be attached also. In this case, the start or centre of the spiral is welded to a steel washer 29 which is secured by a countersunk screw 30 to the diaphragm-actuating member, the subsidiary diaphragm being clamped between the two. Thus, in the event of the working diaphragm not rising when the actuating means is operated to open position, the sub-atmospheric pressure between the diaphragms is effected positively instead of merely by the effort of the spring.

By embodying the spring 26 in, or attaching it to, the diaphragm 25 and securing the latter to the valve cover 6, there are no loose parts when the cover is removed, except for the working diaphragm, which can in consequence easily be renewed when desired.

It will be seen that by means of the invention, opening of a diaphragm valve is ensured when the actuating mechanism is operated, even in cases when the controlled fluid is at a very low pressure.

What I claim as my invention and desire to secure by Letters Patent of the United States is:—

1. A valve, comprising in combination a body having a substantially straight-through passage, a raised weir in said passage, an aperture opposite said weir, a diaphragm closing said aperture, said diaphragm having an operative portion adapted to engage the edge of said weir when the valve is closed, means for moving said diaphragm in an opening direction independently of the pressure of the fluid controlled by the valve.

2. A valve, comprising in combination a body, inlet and outlet passages in said body, a raised transverse weir between said passages, an imperforate diaphragm secured to said body above said weir, said diaphragm having an operative portion adapted to engage said weir when the valve is closed, an actuating member for said diaphragm, means provided on said actuating member whereby said diaphragm may be moved in an opening direction independently of the pressure of the fluid controlled by the valve.

3. A valve, comprising in combination a body having a substantially straight-through passage, a raised transverse weir in said passage, a diaphragm opposite said weir forming part of the wall of said passage and adapted to engage said weir when the valve is closed, a support for said diaphragm when the valve is open, an actuating member for said diaphragm, an operative connection between said actuating member and said diaphragm whereby the valve may be opened independently of the pressure of the fluid controlled by the valve.

4. A valve, comprising in combination a body, having a substantially straight-through passage, a raised transverse weir in said passage, an aperture in said body opposite said weir, a diaphragm closing said aperture and adapted to engage the edge of said weir when the valve is closed, an actuating member for said diaphragm, a socket in said actuating member, a projection on the outer side of said diaphragm adapted to be retained in said socket.

5. A valve, comprising in combination a body, having a substantially straight-through passage, a raised transverse weir in said passage, an aperture in said body opposite said weir, a diaphragm closing said aperture and adapted to engage the edge of said weir when the valve is closed, an actuating member for said diaphragm, means for effecting the application of a sub-atmospheric pressure to the outer surface of said diaphragm on the operation of said actuating member for effecting the opening of the valve with the assistance of the pressure of the fluid controlled by the valve.

6. A valve comprising in combination a body having a substantially straight-through passage, a raised transverse weir in said passage, an aperture in said body opposite said weir, a diaphragm closing said aperture and adapted to engage the edge of said weir when the valve is closed, an actuating member for said diaphragm, means for effecting the application of a sub-atmospheric pressure to the outer surface of said diaphragm on the operation of said actuating member for effecting the opening of the valve with the assistance of the pressure of the fluid controlled by the valve, said means including a hollow cylindrical portion in said body and a piston working in said cylinder and connected to said actuating member.

7. A valve, comprising in combination a body having a substantially straight-through passage, a raised transverse weir in said passage, an aperture in said body opposite said weir, a diaphragm closing said aperture and adapted to engage the edge of said weir when the valve is closed, an actuating member for said diaphragm, means for effecting the application of a sub-atmospheric pressure to the outer surface of said diaphragm on the operation of said actuating member for effecting the opening of the valve with the assistance of the pressure of the fluid controlled by the valve, said means including a subsidiary diaphragm disposed between said first-mentioned diaphragm and said actuating member, said subsidiary diaphragm being adapted to follow the movement of said actuating member.

8. A valve, comprising in combination a body having a substantially straight-through passage, a raised transverse weir in said passage, an aperture in said body opposite said weir, a diaphragm closing said aperture and adapted to engage the edge of said weir when the valve is closed, an actuating member for said diaphragm, means for effecting the application of a sub-atmospheric pressure to the outer surface of said diaphragm on the operation of said actuating member for effecting the opening of the valve with the assistance of the pressure of the fluid controlled by the valve, said means including a subsidiary diaphragm disposed between said first-mentioned diaphragm and said actuating member, a spiral spring normally of dome-shape adapted to bias said subsidiary diaphragm to follow the opening movement of said actuating member.

9. A valve, comprising in combination a body having a substantially straight-through passage, a raised transverse weir in said passage, an aperture in said body opposite said weir, a diaphragm closing said aperture and adapted to engage the edge of said weir when the valve is closed, an actuating member for said diaphragm, means for effecting the application of a sub-atmospheric pressure to the outer surface of said diaphragm on the operation of said actuating member for effecting the opening of the valve with the assistance of the pressure of the fluid controlled by the valve, said means including a subsidiary diaphragm disposed between said first-mentioned diaphragm and said actuating member, a spiral spring normally of dome-shape adapted to bias said subsidiary diaphragm to follow the opening movement of said actuating member, said spiral spring being disposed between said diaphragms and attached to said actuating member.

In testimony whereof I affix my signature.

PHILIP KEITH SAUNDERS.